United States Patent
Alfke

(10) Patent No.: US 7,836,136 B1
(45) Date of Patent: *Nov. 16, 2010

(54) METHOD AND APPARATUS FOR PROCESSING ELECTRONIC MESSAGES

(75) Inventor: Jens Peter Alfke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/496,865

(22) Filed: Jul. 31, 2006

Related U.S. Application Data

(63) Continuation of application No. 10/741,948, filed on Dec. 19, 2003.

(51) Int. Cl.
*G06F 15/16* (2006.01)

(52) U.S. Cl. .................. 709/206; 709/205; 709/207

(58) Field of Classification Search .............. 709/205, 709/206, 207
See application file for complete search history.

(56) References Cited

U.S. PATENT DOCUMENTS

| | | | |
|---|---|---|---|
| 5,072,412 A | 12/1991 | Henderson et al. | |
| 5,617,539 A | 4/1997 | Ludwig et al. | |
| 5,854,893 A | 12/1998 | Ludwig et al. | |
| 5,880,731 A | 3/1999 | Liles et al. | |
| 5,896,500 A | 4/1999 | Ludwig et al. | |
| 6,121,533 A | 9/2000 | Kay | |
| 6,237,025 B1 | 5/2001 | Ludwig et al. | |
| 6,351,762 B1 | 2/2002 | Ludwig et al. | |
| 6,437,818 B1 | 8/2002 | Ludwig et al. | |
| 6,583,806 B2 | 6/2003 | Ludwig | |
| 6,594,688 B2 | 7/2003 | Ludwig et al. | |
| 6,763,226 B1 | 7/2004 | McZeal, Jr. | |
| 7,152,093 B2 | 12/2006 | Ludwig | |
| 7,164,423 B1 | 1/2007 | Westen | |
| 7,206,809 B2 | 4/2007 | Ludwig | |
| 7,234,117 B2 | 6/2007 | Zaner et al. | |
| 7,421,470 B2 | 9/2008 | Ludwig | |
| 7,433,921 B2 | 10/2008 | Ludwig | |
| 2002/0152877 A1 | 10/2002 | Kay | |
| 2003/0016658 A1* | 1/2003 | Creamer et al. | 370/352 |
| 2003/0135659 A1* | 7/2003 | Bellotti et al. | 709/313 |
| 2004/0015610 A1* | 1/2004 | Treadwell | 709/246 |
| 2004/0039630 A1* | 2/2004 | Begole et al. | 705/11 |
| 2004/0078448 A1 | 4/2004 | Malik et al. | |

(Continued)

OTHER PUBLICATIONS

Gordano Messaging Suite Data Sheet, Gordano Limited 1994-2003, pp. 1-6, North Somerset UK.

(Continued)

*Primary Examiner*—John Follansbee
*Assistant Examiner*—Nghi V Tran
(74) *Attorney, Agent, or Firm*—Blakely, Sokoloff, Taylor & Zafman LLP

(57) ABSTRACT

Methods and apparatuses for processing electronic messages are described herein. In one aspect of the invention, for an outgoing message addressed to a mail address of a recipient, the mail client determines whether is an alternative messaging system available to the mail address of the recipient. If there is an alternative messaging system available, the mail client determines whether the recipient's alternative messaging system is online. If so, the mail client sends the mail message to the recipient via the alternative messaging system. Otherwise, the mail client sends the message via normal mail system. Other methods and apparatuses are also described.

42 Claims, 9 Drawing Sheets

U.S. PATENT DOCUMENTS

| | | | |
|---|---|---|---|
| 2004/0078596 A1* | 4/2004 | Kent et al. | 713/201 |
| 2004/0128356 A1* | 7/2004 | Bernstein et al. | 709/206 |
| 2004/0158610 A1* | 8/2004 | Davis et al. | 709/206 |
| 2004/0158611 A1* | 8/2004 | Daniell et al. | 709/206 |
| 2004/0172455 A1 | 9/2004 | Green et al. | |
| 2004/0186896 A1 | 9/2004 | Daniell et al. | |
| 2004/0215721 A1* | 10/2004 | Szeto et al. | 709/204 |
| 2004/0254998 A1* | 12/2004 | Horvitz | 709/206 |
| 2005/0080852 A1 | 4/2005 | Kelley et al. | |
| 2005/0080867 A1 | 4/2005 | Malik et al. | |
| 2005/0094621 A1* | 5/2005 | Acharya et al. | 370/352 |
| 2007/0130259 A1 | 6/2007 | Daniell et al. | |
| 2008/0098078 A1* | 4/2008 | Daniell | 709/206 |

OTHER PUBLICATIONS

Fastmobile.com. Fastmobile's fastchat Instant Communications Application is Coming to Thousands of Mobile Phone Retail Stores Nationswide. Sep. 2003.

Ljungstrand, Peter. Awareness of Presence, Instant Messaging and WebWho. SIGGSROUP Bulletin. Dec. 2000.

Venolia, Gina D. Understanding Sequence And Reply Relationships Within Email Conversations: A mixed-Model Visualization ACM Apr. 2003.

Liam Bannon, et al., "Evaluation and Analysis of Users' Activity Organization," CHI '83 Proceedings, Dec. 1983, pp. 54-57.

Peter C. S. Wong, et al., "Flair-User Interface Dialog Design Tool," Computer Graphics vol. 16, No. 3, Jul. 1982, pp. 87-98.

David R. Cheriton, "Man-Machine Interface Design For Timesharing Systems," University of Waterloo, Ontario, Canada, pp. 362-366.

Michael Good, "Etude and the Folklore of User Interface Design," Laboratory for Computer Science, Massachusetts Institute of Technology, Cambridge, Massachusetts, USA, ACM 1981, pp. 34-43.

D. Austin Henderson, Jr. et al., "Rooms: The User of Multiple Virtual Workspaces to Reduce Space Contention in a Window-Based Graphical User Interface," ACM Transactions on Graphics, vol. 5, No. 3, Jul. 1986, pp. 211-243.

Stuart K. Card, et al., "A Multiple Virtual-Workspace Interface To Support User Task-Switching," CHI + GI 1987, ACM, pp. 53-59.

Eugene Ball, et al., "A Test-Bed for User Interface Designs," Carnegie Mellon University, Pittsburgh, PA, USA, ACM 1981, pp. 85-88.

Warren Teitelman, "Ten Years of Window Systems-A Retrospective View," Methodology of Window Management, Proceedings of an Alvey Workshop at Cosener's House, Abingdon, UK, Apr. 1985. 13 pages.

Eve M. Schooler et al., "Multimedia Conferencing: Has It Come of Age?", Reprinted from the Proceedings $24^{th}$ Hawaii International Conference on System Sciences, vol. 3, pp. 707-716 (Jan. 1991) pp. 1-10.

Eve M. Schooler, "A Distributed Architecture for Multimedia Conference Control," ISI Research Report, Nov. 1991, University of Southern California Information Sciences Institute, Title page, pp. 1-18.

Eve M. Schooler, "The Connection Control Protocol: Architecture Overview," Version 1.0, USC/Information Sciences Institute, Jan. 1992, pp. 1-6.

Joseph D. Touch, "Zoned Analog Personal Teleconferencing (ZAPT)," USC/Information Sciences Institute, pp. 1-19.

Eve M. Schooler, "Case Study: Multimedia Conference Control in a Packet-switched Teleconferencing System", USC/Information Sciences Institute, pp. 1-17.

Terrence Crowley, et al., "MMConf: An Infrastructure for Building Shared Multimedia Applications" CSCW '90 Proceedings, Oct. 1990, pp. 329-342.

Harry Forsdick, "Explorations into Real-time Multimedia Conferencing," Computer Message Systems-85, IFIP, 1986, pp. 331-347.

Robert W. Root, "Design of a Multi-Media Vehicle for Social Browsing," Bell Communications Research, Morristown, NJ, USA, ACM 1988, pp. 25-38.

S.R. Ahuja et al., "A Comparison of Application Sharing Mechanism in Real-Time Desktop Conferencing Systems," AT&T Bell Laboratories, Holmdel, NJ, USA, ACM 1990, pp. 238-248.

Hiroshi Ishi, "TeamWorkStation: Towards a Seamless Shared Workspace," NTT Human Interface Laboratories, Japan, CSCW '90 Proceedings, Oct. 1990, pp. 13-26.

Thomas Kaeppner et al., Architecture of HeiPhone: A Testbed for Audio/Video Teleconferencing, IBM European Networking Center, Heidelberg, pp. 1-17.

Kankanahalli Srinivas et al., "MONET: A Multi-media System for Conferencing and Application Sharing in Distributed Systems," CERC Technical Report Series Research Note, Feb. 1992, 10 pages (2-sided).

* cited by examiner

METHOD AND APPARATUS FOR PROCESSING ELECTRONIC MESSAGES

This application is a continuation of co-pending U.S. patent application Ser. No. 10/741,948, filed on Dec. 19, 2003.

FIELD OF THE INVENTION

The present invention relates generally to data processing. More particularly, this invention relates to electronic message processing.

BACKGROUND OF THE INVENTION

In computer network systems such as local-area networks ("LANs"), wide-area networks ("WANs"), and the Internet and the worldwide web ("WWW") which operates thereon, email systems and associated protocols are often utilized to facilitate communication between two users of the network or email system. Each user has a unique network address which may be used for routing and identifying purposes in delivering an email message from one user (the "sender") to another user (the "recipient") on the network.

Email messages are typically sent from a sender to a recipient by the sender typing or otherwise preparing an email message on a PC (personal computer), which is itself typically coupled to a server coupled to a communications network such as the Internet. The email contains both a body or content portion, which contains the message itself, and the network email address(es) of the recipient(s). Email messages can also include more complex information such as attached files. In general, however, each email transmission from a sender to a recipient over a network includes some body or message portion and the network addresses of the sender and recipient. The email transmission may be referred to, in general, as an email message, which is transmitted via a network from a sender to a recipient.

The email message is thus transmitted from the sender PC to the local network router or server (e.g., an email server), which delivers the email message in packetized form to the network. The packets are each routed from one node of the network to another, in accordance with the recipient address information associated with the packets. These packets are received by a recipient server of the network, which can then assemble the received packets into the original email message and deliver the email message to the recipient's PC, which is attached to the recipient server. The email message may be routed through one or more routing servers between the sender's server and the recipient's server. These routing servers may be different types of servers provided by different vendors. The routing servers may queue and schedule the routing the email message according to its own schedule. As a result, the delivery of the email message may be delayed by the routing servers and such delays are sometimes unacceptable. In addition, such delay prevents the recipient from providing the sender an instant confirmation of arrival of the email message at the recipient, even if the sender enables a return receipt option on the outgoing email message.

For many users, the send and receive email server functions are performed by a service provider such as an Internet service provider (ISP). In order to receive email, a user must first "log in" to his ISP, typically by use of a modem and telephone line or other communications channel such as a cable system cable. Any email messages which have been received by the ISP for the user since the last time the user logged in to his ISP may then be delivered to the user-recipient. If the user keeps his PC continually logged on to his ISP and is present at his PC, he can receive email as soon as it is received by his ISP. The user's own PC may be configured to alert the user when it receives the email message from the ISP. However, many users log in only periodically to check for email messages. Thus, if an important email message arrives while the user is not logged in or is away from his PC terminal, the user will not be aware of this.

SUMMARY OF THE DESCRIPTION

Methods and apparatuses for processing electronic messages are described herein. In one aspect of an exemplary embodiment of the invention, for an outgoing message addressed to a mail address (e.g., an Internet email address) of a recipient, the mail client of a sender determines whether there is an alternative messaging system (e.g., an instant messaging system or a chat system) available to the mail address of the recipient. If there is an alternative messaging system available, the mail client determines whether the recipient's alternative messaging system is online. If so, the mail client sends the mail message to the recipient via the alternative messaging system. Otherwise, the mail client sends the message via a normal mail system.

In one aspect of an exemplary embodiment of the invention, when an incoming message is received at an alternative messaging system of a recipient, such as an instant messaging (IM) client, the message is examined whether the message is a mail message. If it is determined that the message is a mail message, the message is then forwarded to the corresponding mail client of the recipient and displayed as an ordinary mail message as if it is received from the corresponding mail server.

According to yet another aspect of an exemplary embodiment of the invention, when a mail client is launched, it registers with an alternative messaging client, such as an IM client. The alternative messaging client then advertises in its associated community that it is capable of processing mail messages.

According to yet another aspect of an exemplary embodiment of the invention, an alternative messaging server, such as an IM server, receives a message from a first messaging client of a first user, which is sent by a first mail client of the first user. The first mail client is communicatively coupled to the first messaging client of the first user. In response to the message, the alternative messaging server substantially instantly sends the message to a second messaging client of a second user, which is communicatively coupled to a second mail client of the second user. The message is then forwarded from the second messaging client to the second mail client and the second mail client processes the message as an ordinary mail message as if it is received from the first mail client of the first user via a mail server.

The present invention also discloses machine readable media which may be executed by a processor to perform the above processes. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
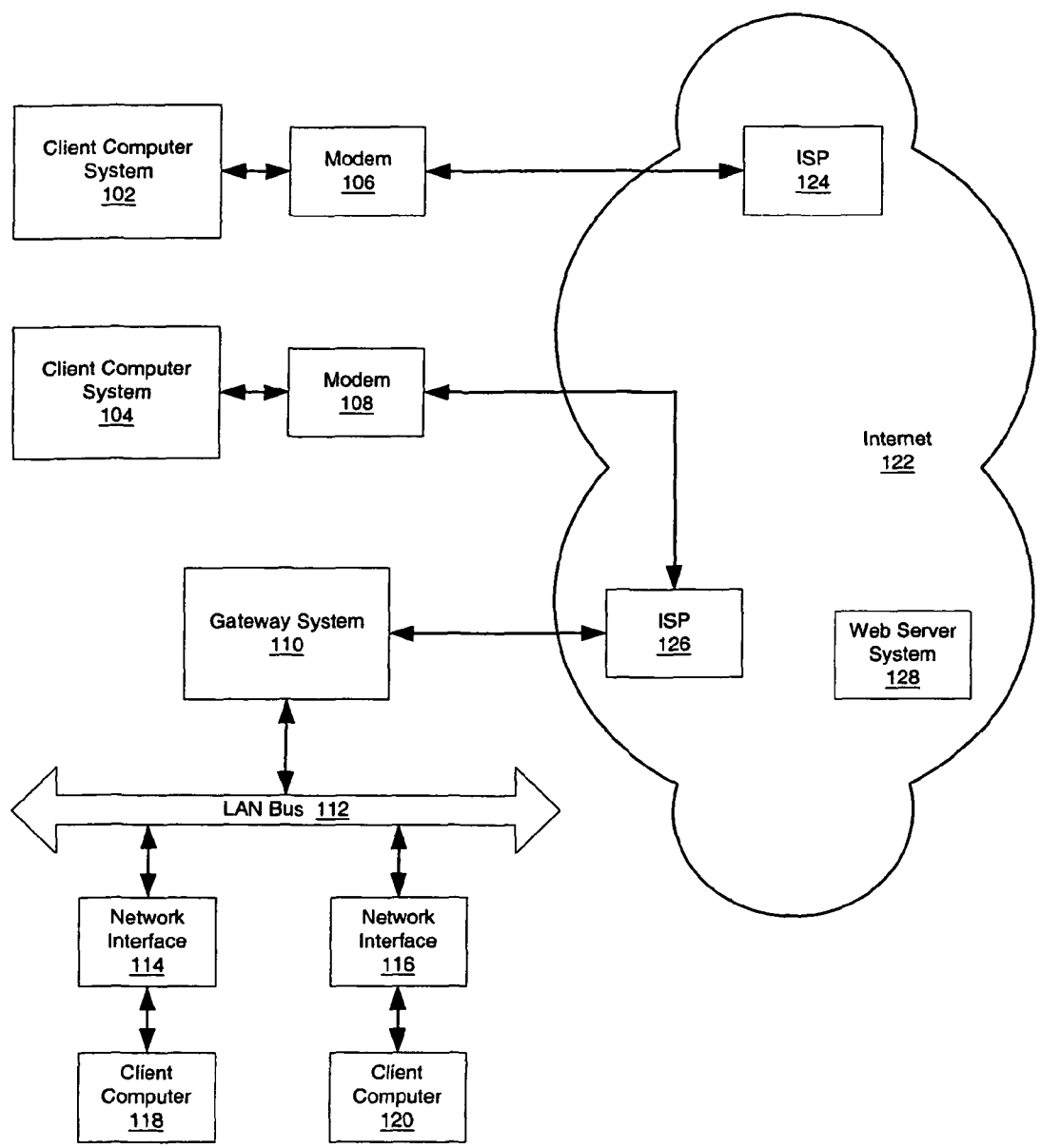
FIG. 1 is a block diagram of a network of computer systems in which electronic messages may be processed, according to one embodiment of the invention.

Method and apparatus for processing electronic messages are described herein. In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a diagram of a network of computer systems in which an email may be processed via an alternative message delivery system other than an email system, according to one embodiment of the present invention. As shown in FIG. 1, a network 100 includes a number of client computer systems that are coupled together through an Internet 122. It will be appreciated that the term "Internet" refers to a network of networks. Such networks may use a variety of protocols for exchange of information, such as TCP/IP, ATM, SNA, SDI, etc. The physical connections of the Internet and the protocols and communication procedures of the Internet are well known to those in the art. It will be also appreciated that such system may be implemented in an Intranet within an organization.

Access to the Internet 122 is typically provided by Internet service providers (ISPs), such as the ISP 124, and the ISP 126. Users on client systems, such as the client computer systems 102, 104, 118, and 120, generally obtain access to the Internet through Internet service providers, such as ISPs 124 and 126. Access to the Internet may facilitate transfer of information (e.g., email, text files, media files, etc.) between two or more digital processing systems, such as the client computer systems 102, 104, 118, and 120 and/or a Web server system 128. For example, one or more of the client computer systems 102, 104, 118, and 120 and/or the Web server 128 may provide document presentations (e.g., a Web page) to another one or more of the client computer systems 102, 104, 118, and 120 and/or Web server 128. For example, in one embodiment of the invention, one or more client computer systems 102, 104, 118, and 120 may request to access a document that may be stored at a remote location, such as the Web server 128. In the case of remote storage, the data may be transferred as a file (e.g., download) and then displayed (e.g., in a window of a browser) after transferring the file. In another embodiment, the document presentation may be stored locally at the client computer systems 102, 104, 118, and/or 120. In the case of local storage, the client system may retrieve and display the document via an application, such as a word processing application. Without requiring a network connection.

The Web server 128 typically includes at least one computer system to operate with one or more data communication protocols, such as the protocols of the World Wide Web, and as such, is typically coupled to the Internet 122. Optionally, the Web server 128 may be part of an ISP which may provide access to the Internet and/or other network(s) for client computer systems. The client computer systems 102, 104, 118, and 120 may each, with appropriate Web browsing software, access data, such as HTML document (e.g., Web pages), which may be provided by the Web server 128.

The ISP 124 provides Internet connectivity to the client computer system 102 via a modem interface 106, which may be considered as part of the client computer system 102. The client computer systems 102, 104, 118, and 120 may be a conventional data processing system, such as a Power Mac G5 or iMac computer available from Apple Computer, Inc., a "network" computer, a handheld/portable computer, a cell phone with data processing capabilities, a Web TV system, or other types of digital processing systems (e.g., a personal digital assistant (PDA)).

Similarly, the ISP 126 provides Internet connectivity for the client computer systems 102, 104, 118, and 120. However, as depicted in FIG. 1, such connectivity may vary between various client computer systems, such as the client computer systems 102, 104, 118, and 120. For example, as shown in FIG. 1, the client computer system 104 is coupled to the ISP 126 through a modem interface 108, while the client computer systems 118 and 120 are part of a local area network (LAN). The interfaces 106 and 108, shown as modems 106 and 108, respectively, may represent an analog modem, an ISDN modem, a DSL modem, a cable modem, a wireless interface, or other interface for coupling a digital processing system, such as a client computer system, to another digital processing system. The client computer systems 118 and 120 are coupled to a LAN bus 112 through network interfaces 114 and 116, respectively. The network interface 114 and 116 may be an Ethernet-type, asynchronous transfer mode (ATM), or other type of network interface. The LAN bus is also coupled to a gateway digital processing system 110, which may provide firewall and other Internet-related services for a LAN. The gateway digital processing system 110, in turn, is coupled to the ISP 126 to provide Internet connectivity to the client computer systems 118 and 120. The gateway digital processing system 110 may, for example, include a conventional server computer system. Similarly, the Web server 128 may, for example, include a conventional server computer system.

Client computers 102, 104, 118, and 120 may be able to send and receive email messages from each other. The email systems used by client computers 102, 104, 118, and 120 may be proprietary email systems, such as IBM Lotus Notes. Alternatively, the email systems used by the client computers may be standard email systems, such as email systems using POP3 (post office protocol), SMTP (simple mail transport protocol), or IMAP (Internet message access protocol) protocols. According to one embodiment, the email client running at the client computers 102, 104, 118, and 120 may determine whether there is an alternative message delivery mechanism, such as, for example, instant messaging (IM) system, to deliver the email message quicker. If the sender's email client determines that there is an alternative (e.g., a better alternative) available, the email client may interact with an application of the alternative delivery mechanism. The alternative delivery mechanism may deliver the email message to the recipient via the alternative delivery system, instead of going through the normal email server which routes the email message (via one or more routing servers) to the recipient's email server, and thereafter, the recipient's email server forwards the message to the recipient.

According to another embodiment, the alternative delivery mechanism, such as an IM system, may be able to detect whether the counterpart application of the recipient is enabled (e.g., online). The email client of the sender may interrogate the alternative delivery system to determine the status of the recipient's counterpart and its capability. The email client of the sender may only transmit the email message to the alternative delivery system if the alternative delivery system of the recipient is active (e.g., online) and able to receive such email messages. Otherwise, the email client of the sender may delivery the email message through a normal email server.

According to one embodiment, in order to distinguish the email message from other messages delivered by the alternative delivery system, the email message may be tagged with an identification indicating the message being delivered is an email message and repackaged in a format compatible with the message requirement of the alternative delivery system. On the other side, when a recipient's counterpart alternative delivery system (e.g., IM client) receives the message, the message may be examined (via the tagged identification) to determine whether the message is an email message. If the message is an email message, the recipient's counterpart may reroute the message to the email client of the recipient. In one embodiment, either the alternative delivery system or the email client repackages the message as an ordinary email message and the email client displays the message as if it is received from the corresponding email server. Such actions are performed transparently to a user of the recipient and the user does not know whether the email message may be received via the alternative delivery system.

Figure 2A:
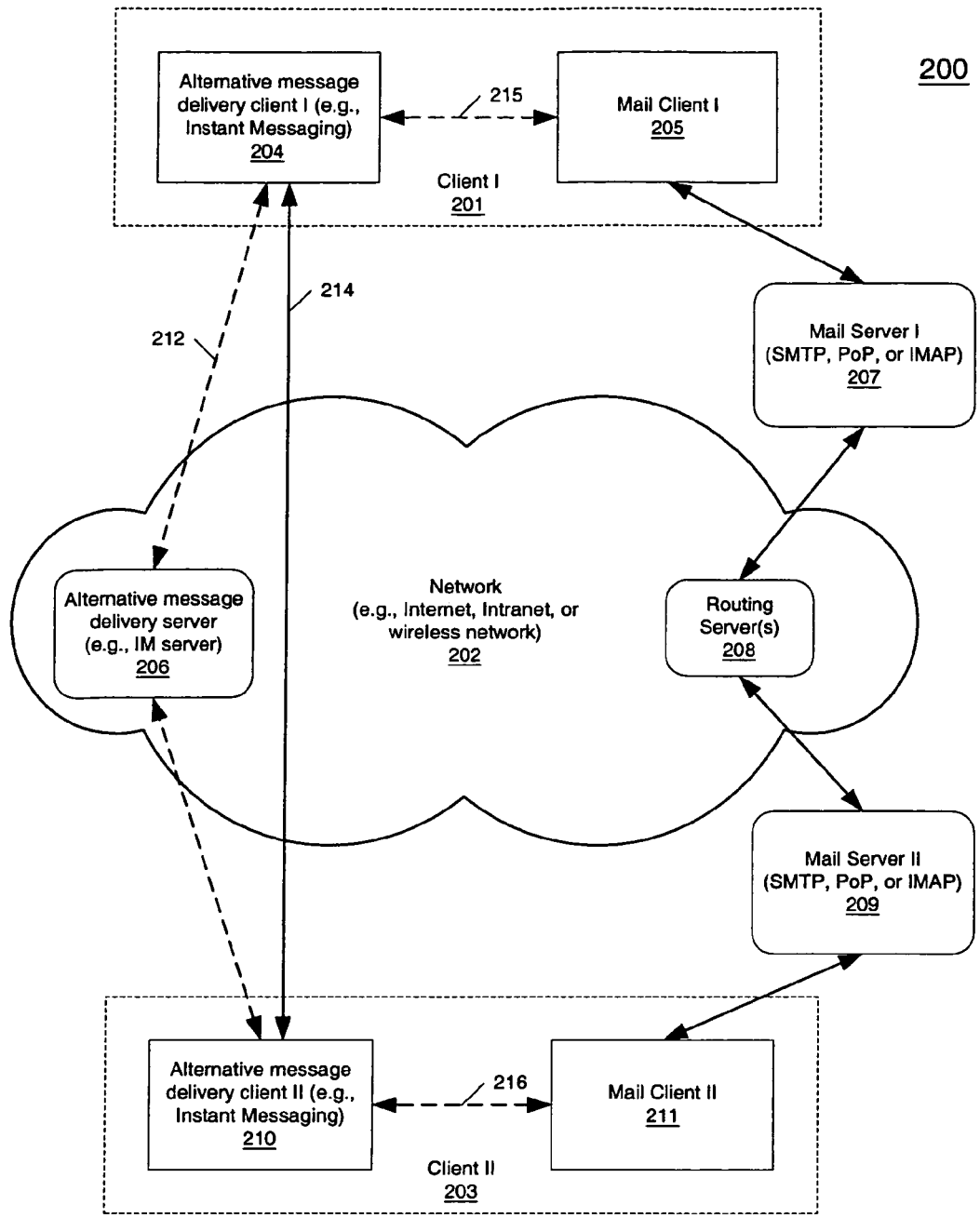
FIG. 2A is a block diagram illustrating an exemplary system for processing electronic messages, according to one embodiment of the invention.

FIG. 2A is a block diagram of an exemplary message processing system according to one embodiment of the invention. In one embodiment, exemplary system 200 includes clients 201 and 203 communicating with each other over a network 202. Network 202 may be an Internet, an Intranet, or a wireless network. Typically, client 201 may communicate with client 203 via an email system including mail clients 205 and 211, mail servers 207 and 209, and one or more routing servers 208 within the network 202. Mail servers 207 and 209 may use mail protocols, such as POP3, SMTP, or IMAP protocols, to process mail messages. A typical mail server may include an SMTP server for handling outgoing mail messages and a POP3 server for handling incoming mail messages. Alternatively, mail servers 207 and 209 may be proprietary mail servers provided by the same or different vendors. IM clients 204 and 210 may communicate with each other using a variety of communication protocols, such as, for example, proprietary protocols or the instant messaging and presence protocol proposed by the IETF (Internet Engineering Task Force).

In addition, clients 201 and 203 may be separately and independently running an alternatively message delivery system, such as, for example, an instant messaging (IM) system. In our fast-paced world, sometimes even the rapid response of email is not fast enough. A user has no way of knowing if the person the user is sending email to is online at that particular moment or not. Also, the email sending through the network may be delayed by one or more routing servers. As a result, more and more alternative message delivery systems, such as instant messaging, are getting more popular. A typical IM system may include IM clients 204 and 210 running at client 201 and 203 respectively. IM clients 204 and 210 may communicate with IM server 206 shared with IM clients 204 and 210.

Instant messaging allows a user to maintain a list of people that the user wishes to interact with. A user may send messages to any of the people in the list, also referred to as a buddy list or contact list, as long as that person is online. Sending a message opens up a small window where the user and its friend can type in messages that both can see. Most of the popular instant messaging programs, such as AOL's AIM, or IM from Yahoo, provide a variety of features, such as swapping instant messages, chat, Web links, images, sounds, and files, and others (e.g., talk and streaming content). After the initial registration with the IM server 206 through paths 212 and 213, IM server 206 allows the message to be transmitted to the intended recipient without having the message queued or delayed by a local mail server, as typically required by the conventional mail delivery mechanism. In addition, some IM systems allow IM clients 204 and 210 to directly communicate with each other (through path 214) without involving IM server 206, using in part of the respective IP address and a port assigned to the IM services. As a result, messages exchanged between clients 204 and 210 are delivered in a faster manner.

According to one embodiment, IM clients 204 and 210 may interact with mail clients 205 and 211 respectively, such that mail messages of mail clients 205 and 211 may be delivered or received via the IM clients 204 and 210 utilizing the advanced features of the IM system, which will be described in details further below. In one embodiment, when mail client 205 is launched and initialized, mail client 205 may register, via path 215, with IM client 204 to enable mail client 205 to transmit and receive mail messages via IM client 204. After mail client 205 has registered with IM client 204, IM client 204 may broadcast or advertise, via IM server 206, in the IM community that IM client 204 is capable of handling mail messages. Other members of the IM community, such as IM client 210, receives such advertisement and may sends further mail messages to IM client 204 subsequently.

Similarly, when mail client 211 is launched and initialized, mail client 211 may register, via path 216, with IM client 210 to enable mail client 211 to transmit and receive mail messages via IM client 210. After mail client 211 has registered with IM client 210, IM client 211 may also broadcast or advertise, via IM server 206, in the IM community that IM client 210 is capable of handling mail messages (e.g., the IM client 210 is "online"). Thereafter, mail clients 205 and 211 may exchange mail messages via IM clients 204 and 210 respectively.

For example, according to one embodiment, when mail client 205 receives a mail message from a user addressed to mail client 211 of a recipient, mail client 205 determines, without involving corresponding mail server 207, whether there is an alternative messaging system, such as IM client 204, available. The determination may be performed based on whether mail client 205 has registered with IM client 204 successfully. If there is no alternative messaging system available, mail client 205 may fall back to its mail server 207 to handle the incoming and outgoing mail messages. In one embodiment, such determination may be performed based on whether the alternative messaging system is installed or whether mail client 205 fails to register with the alternative messaging system, such as IM client 204, using one of the aforementioned techniques.

If it is determined that there is an alternative messaging system available, according to one embodiment, mail client 205 may, via alternative messaging client 204 (e.g., IM client), determine whether the recipient's alternative messaging counterpart, such as alternative messaging client 210 (e.g., IM client), is activated (e.g., online). If the recipient's alternative messaging client is not activated (e.g., offline), mail client 205 may fall back to its mail server 207 to handle the mail messages.

If it is determined that the recipient's alternative messaging counterpart is activated, mail client 205 may determine, via alternative messaging system 204, whether the recipient alternative messaging counterpart (e.g., alternative messaging system 210) is capable of handling mail messages. The determination may be performed based on whether the recipient's mail client 211 has successfully registered with its alternative messaging system 210, which advertises such capability in the associated community, using one of the aforementioned techniques. If it is determined that the recipient's alternative messaging counterpart is unable to handle mail messages, mail client 205 may fall back to its mail server 207 to handle the mail messages.

If the recipient's alternative messaging system is able to handle mail messages, according to one embodiment, mail client 205 may optionally tag an identification with the mail message to indicate that the message being sent is a mail message. Alternatively, according to another embodiment, the tagging may be performed by alternative messaging client 204. Thereafter, mail client 205 transmits the mail message to alternative messaging client 204 where the mail message may be repackaged in a format compatible with the alternative messaging system (e.g., an IM message packet). Alternatively, the mail message may be repackaged by mail client 205. Furthermore, if the message is routed by the alternative messaging server 206, the message may be repackaged by the server 206. The mail message is then sent to the recipient's alternative messaging counterpart 210 over network 202, directly via path 214 or indirectly via server 206.

When the recipient's alternative messaging system, such as IM client 210 receives the message transmitted through either indirectly through server 206 or directly through path 214, according to one embodiment, IM client 210 examines the message packets to determine whether the message is an email message. In one embodiment, IM client 210 may examine the identification tagged with the message to determine whether the message is an email message. If the message is determined to be an ordinary IM message, the message is displayed in a display of the IM client 210.

If the message is determined to be an email message (or a message for other applications), the IM client 210 may reroute the message to corresponding mail client 211. The message received, which may be IM packets, may be repackaged as email messages by mail client 211 and displayed in a display, such as an Inbox, of mail client 211 as if it is received from the corresponding mail server 209. Alternatively, the repackaging may be performed by IM client 210. Such actions are performed transparently to a user of client 203. That is, the user of client 203 does not know whether the message displayed may be transmitted over through an alternative messaging system. Once IM client 210 turns over the message to mail client 211 successfully, IM client 210 may return a success status to IM client 204 of the sender. As a result, client 201 (e.g., the sender) may substantial instantly receive a confirmation of an arrival of the message at client 203.

In addition, when IM client 210 receives the message, IM client 210 may determine whether mail client 211 is running and optionally has logged onto the corresponding server 209. If IM client 210 determines that mail client 211 is not running, IM client 210 may return a failure status to IM client 204 of sender 201. In which case, client 201 may fall back to mail client 205 to resend the message to mail server 207 which forwards the message to mail server 209 of the recipient. Alternatively, if IM client 210 determines that mail client 211 is not running, IM client 210 may attempt to launch mail client 211 and optionally prompt the corresponding user to log in. Furthermore, if IM client 210 determines that mail client 211 is not running, IM client 210 may simply store the message at a storage (e.g., a hard drive) of the recipient 203. The stored message may be retrieved and displayed when the user launches his or her email client 211. Further, IM client 210 may just display a dialog box at a desktop of recipient 203 indicating a new message has arrived, without involving mail client 211. The above options may be configurable through a user interface of recipient 203, such as user preference settings. Other configurations may exist.

In one embodiment, IM clients 204 and mail client 205 may operate independently to each other (e.g., separate applications). That is, client 201 having IM client 204 and mail client 205 installed may not be related to IM server 206. Alternatively, IM clients 204 and mail client 205 may be implemented within the same application or a plugged-in application with respect to each other. Furthermore, the mail system (e.g., mail client 205 and mail server 207) of client 201 may be a different mail system with respect to the mail system (e.g., mail client 211 and mail server 209) of client 203.

Note that the above techniques are not limited to a mail system with an IM system. It will be appreciated that other applications capable of interacting with another application may register with an IM system to transmit and receive data with another application via the IM system. It will be appreciated that the alternative messaging system may not be limited to an IM system, any messaging system may utilize the above described techniques to provide an alternative message routing system to an application capable of communicating with another application, such as an electronic organizer or a Web service application, etc.

Furthermore, clients 201 and 203 are described only for the purposes of a sender or a recipient. Alternative messaging delivery client 204 and mail client 205 are controlled by client 201. However, alternative messaging delivery client 204 and mail client 205 are not limited to be within the same platform. According to one embodiment of the invention, alternative messaging delivery client 204 and mail client 205 may be located at different and separate platforms communicating with each other and controlled by client 201 (e.g., a sender or a recipient). Similarly, alternative messaging delivery client 210 and mail client 211 may be located at different and separate platforms communicating with each other and controlled by client 203 (e.g., a sender or a recipient), as illustrated in FIG. 2B.

Figure 2B:
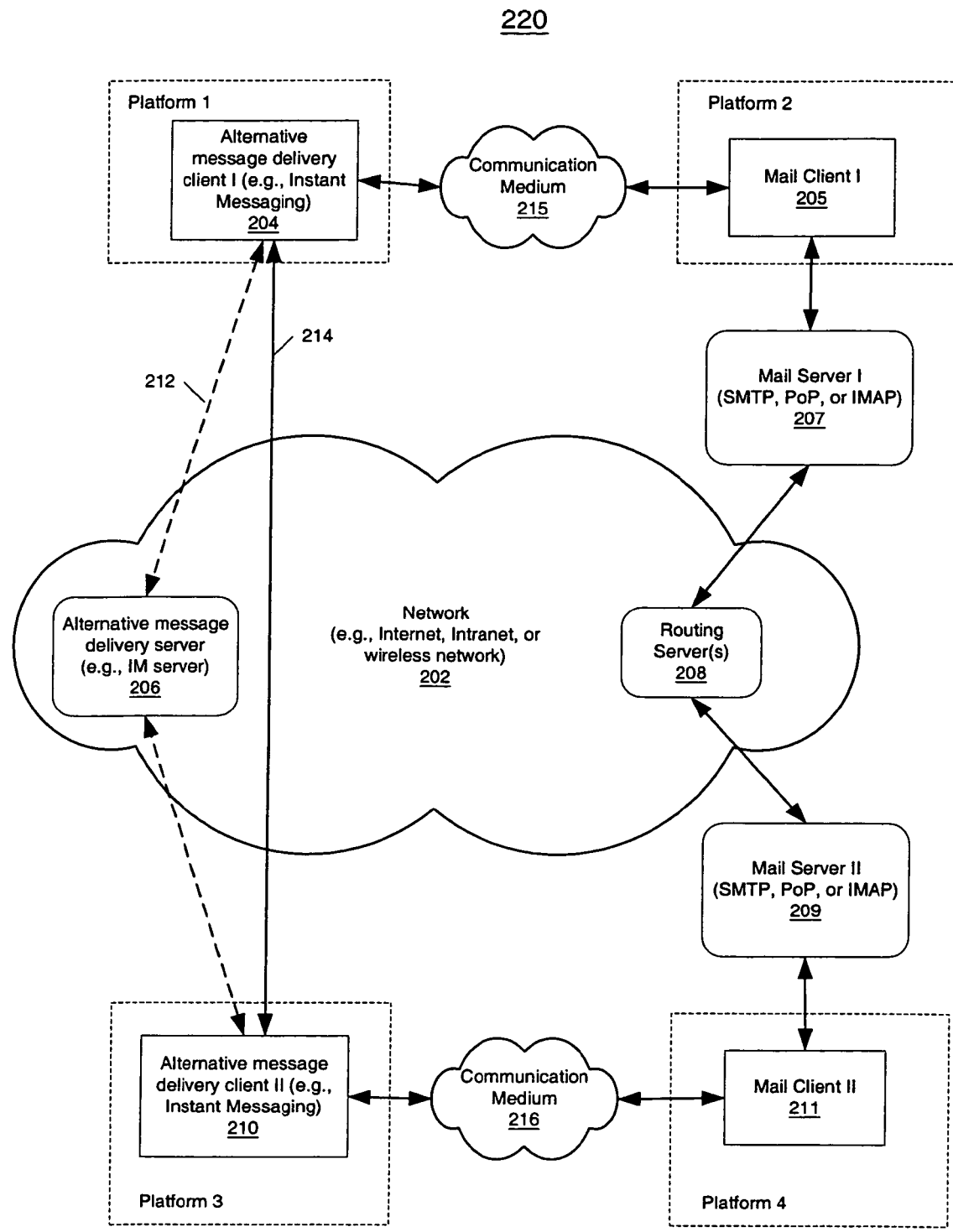
FIG. 2B is a block diagram illustrating an exemplary system for processing electronic messages, according to an alternative embodiment of the invention.

FIG. 2B is a block diagram illustrating an exemplary message processing system according to an alternative embodiment of the invention. Referring to FIG. 2B, alternatively message delivery client 204 and mail client 205 are located within different platforms (e.g., platform 1 and 2) respectively. Platforms 1 and 2 are controlled by a sender or a recipient. Similarly, alternatively message delivery client 210 and mail client 211 are located within different platforms (e.g., platform 3 and 4) respectively. Platforms 3 and 4 are controlled by a sender or a recipient. Alternatively message delivery clients 204 and 210 and mail clients 205 and 211 communicate with each other via communication mediums 215 and 216 respectively. Communication mediums 215 and 216 may be a wired communication medium, such as, for example, a local network area (LAN) connection or a modem connection. Alternatively, communication medium 215 may be a wireless connection, such as, for example, an infrared or a home networking connection (e.g., IEEE 802.xx, such as Bluetooth or WiFi).

For example, platform 1 may represent a desktop computer having a network interface to network 202 while platform 2 may be a handheld device, such as, a cellular phone, a Palm pilot, a two-way pager, or an email platform (e.g., a BlackBerry platform from Research In Motion of Waterloo, ON), etc. When a sender represented by platforms 1 and 2 desires to send a mail message to a recipient represented by platforms 3 and 4, mail client 205 communicates with alternative message delivery client 204 to determine whether alternative message delivery client 204 is available and able to handle mail message via communication medium 215. If alternative message delivery client 204 is available and able to handle mail message, mail client 205 transmits the mail message from platform 2 to platform 1 via communication medium 215. Alternative message delivery client 204 then sends the mail message via the associated messaging system to the corresponding alternative message delivery client 210 of platform 3, which is controlled by the recipient. Thereafter, alternative message delivery client 210 of platform 3 forwards the received message to mail client 211 of platform 4, which is also controlled by the recipient, using one of the aforementioned techniques.

Figure 2C:
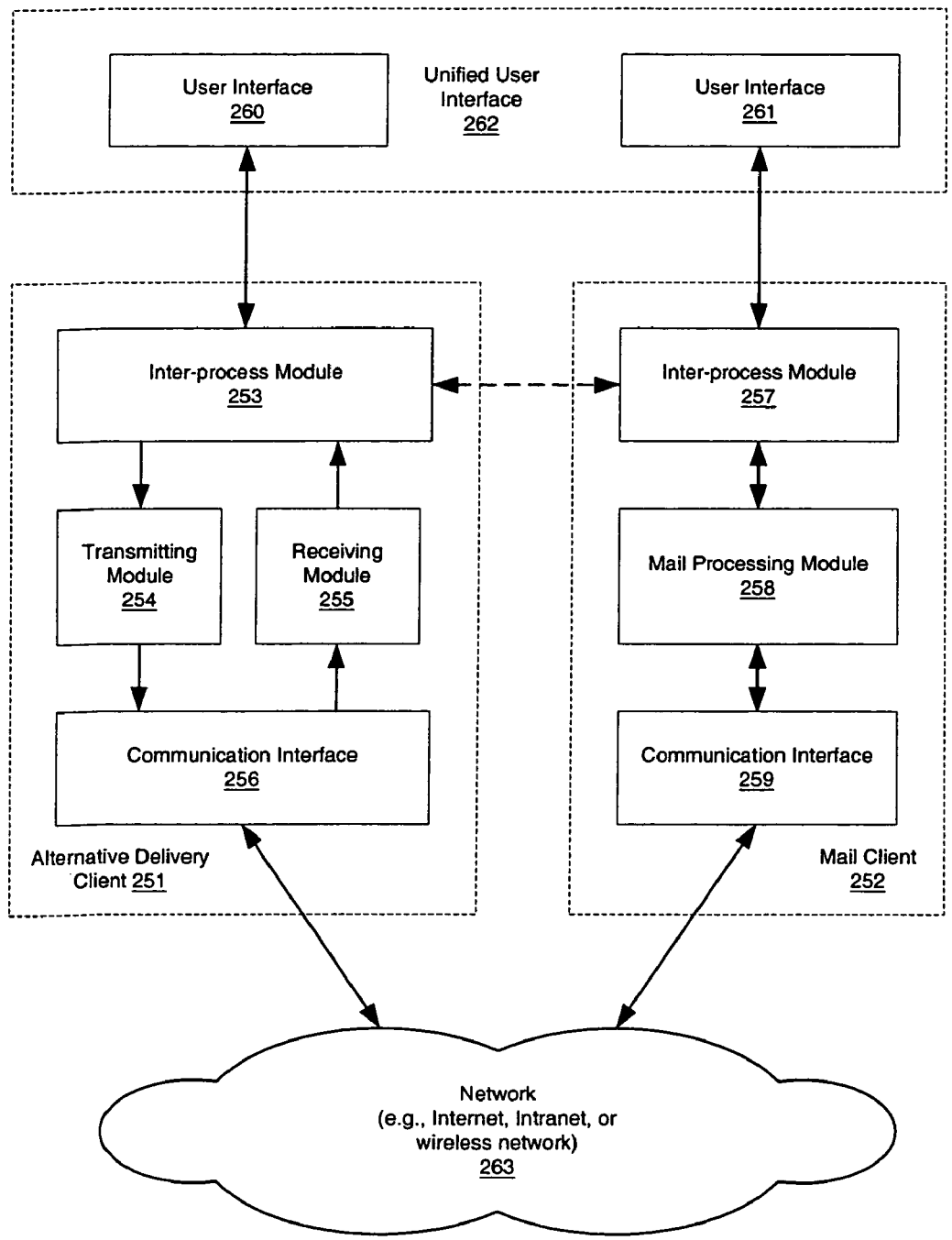
FIG. 2C is a block diagram illustrating an exemplary mail client and an alternative delivery client according to one embodiment of the invention.

FIG. 2C is a block diagram illustrating an exemplary client having a mail client and an alternative delivery client communicatively coupled to each other according to one embodiment of the invention. The exemplary client 250 may represent clients 201 and 203 of FIG. 2A. In one embodiment, exemplary client 250 includes a mail client 252 communicatively coupled to an alternative delivery client 251. Similar to a conventional mail client, mail client 252 includes a user interface 261, a mail processing module 258, and a communication interface 259. User interface 257 may include an inbox to display incoming messages and an editor to allow a user to prepare an outgoing message. Mail processing module may communicate with a mail server (not shown) via communication interface 252 to transport and to receive outgoing and incoming messages. In addition, according to one embodiment, mail client further includes an inter-process module 257 that is able to communicate with another application, such as, for example, an IM client or an electronic organizer, etc.

In one embodiment, alternative delivery client 251 includes a user interface 260, an inter-process module 253, a transmitting module 254, a receiving module 255, and a communication interface 256. Transmitting module 254 is responsible for transmitting an outgoing message in accordance with a communication protocol to a destination via communication interface 256 and network 263. Receiving module 255 is responsible for receiving an incoming message from an originator via communication interface 256 and network 263. User interface 260 may include a display window to display an incoming message and an editor to allow a user to prepare an outgoing message. Inter-process module 253 is responsible for handling traffic between user interface 260 and transmitting module 254 and receiving module 255. In addition, inter-process module further handles communication between client 251 and mail client 252.

User interfaces 260 and 261 may be separate user interfaces for handling different messages respectively. According to one embodiment, user interfaces 260 and 261 may be integrated as a unified user interface 262 to handle both mail messages and non-mail messages. For example, unified user interface 262 may include a window as an inbox to display both incoming mail messages and other non-mail messages, such as IM messages. Alternatively, alternative delivery user interface 260 may be a stand-alone user interface, while mail client 252 includes unified user interface 262 that includes the alternative delivery user interface 260. Further detailed information concerning the unified user interface can be found in a co-pending U.S. patent application Ser. No. 10/741,660, by Stephen O. Lemay et al., entitled "Unified User Interface for Instant Messaging and Email", filed Dec. 19, 2003, and assigned to a common assignee of the present application. The above-identified U.S. patent application is hereby incorporated by reference.

According to one embodiment, when mail client 252 is launched, inter-process module 257 may determine whether an alternative delivery mechanism is available. In one embodiment, the alternative delivery mechanisms, including the associated recipient's addresses, may be listed within an address book of mail client 252. If an alternative delivery mechanism is available, mail client 252 may register with the alternative delivery client 251 to inform alternative delivery client 251 that mail client 252 is up and running. If alternative delivery client 251 is not running or active, mail client 252 may optionally launch alternative delivery client 251 and register with alternative delivery client 251 thereafter. Once the mail client 252 and the alternative delivery client 251 have established a connection, the alternative delivery client 251 may advertise in its respective community that it can handle messages associated with the mail client 252.

In one embodiment, when a sender prepares an outgoing message using user interface 261, user interface 261 transmits the outgoing message to inter-process module 257. Inter-process module 257 determines whether client 250 has an alternative delivery mechanism. In one embodiment, an alternative delivery mechanism may be identified through a lookup operation in an address book associated with mail client 252. If inter-process module 257 determines that an alternative delivery mechanism exists, inter-process module 257 may communicate with the associated alternative delivery client 251 via the previously established inter-process connection. Alternatively, inter-process module 257 may dynamically launch the alternative delivery client 251 and establish such an inter-process connection.

If the alternative delivery client 251 is up and running, inter-process module 257 of mail client 252 may interrogate with alternative delivery client 251 via respective inter-process module 253 to determine whether an intended recipient's corresponding alternative delivery mechanism is online and whether the intended recipient's alternative delivery mechanism is capable of receiving a mail message (e.g., whether it is able to redirect an incoming message to a mail client of the recipient). If it is determined that the recipient's alternative delivery mechanism is online and capable of handling mail massages, inter-process module 257 transmits the outgoing mail message to the alternative delivery client 251. Otherwise, inter-process module 257 transmits the outgoing mail message to mail processing module 258 and the mail processing module 258 processes the outgoing mail message as an ordinary mail message.

When inter-process module 253 of the alternative delivery client 251 receives the outgoing mail message received from mail client 252, according to one embodiment, inter-process module 253 transmits the message to transmitting module 254. Transmitting module 254 then delivers the message to the intended recipient via communication interface 256 and network 263, as if the message is an ordinary message associated with the alternative delivery client 251. In addition, inter-process module 253 or the transmitting module 254 may repackage the mail message into a message compatible with a communication protocol associated with the alternative delivery mechanism. Furthermore, inter-process module 253 may further tag the message to indicate that the message is a mail message before transmitting the message to transmitting module 254. Alternatively, the tagging and repackaging may be performed by the mail client 252.

For the purposes of illustration, it is assumed that client 250 is now representing a recipient to receive a mail message transmitted via an alternative delivery mechanism from a sender. According to one embodiment, the message is received by receiving module 255 via communication interface 256. The receiving module 255 transmits the message to inter-process module 253. The inter-process module 253 may examine the message to determine whether the message is a mail message by, for example, examining the identification or signature tagged by the sender. If the message is determined to be a mail message, inter-process module 253 may transmits the message to inter-process module of mail client 252 via a inter-process connection. Otherwise, inter-process module 253 may transmit the message to the corresponding user interface 260 and user interface 260 displays the message as an ordinary message associated with the alternative delivery client 251.

When inter-process module 257 of mail client 252 receives the message from the alternative delivery client 251, inter-process module 257 transmits the message to the corresponding user interface 261 where the message is displayed as an ordinary mail message. The above operations may be performed transparently to a user of mail client 252. In addition, inter-process module 257 may further perform repackaging the message into a mail message, as well as other operations, such as, for example, stripping off the tagged-identification, before transmitting the message to user interface 261. The repackaging or the operations may be performed by the alternative delivery client 251, such as inter-process module 253 or receiving module 255.

Furthermore, if user interfaces 260 and 261 are implemented as unified user interface 262, the message may be directly delivered to the unified user interface 262 by inter-process module 253, where the unified user interface 262 may examine the message (e.g., examining the tagged identification) and display the message accordingly. Other operations apparent to those with ordinary skill in the art may be performed.

As described above, client 250 may represent a sender or a recipient. Alternative delivery client 251 and mail client 252 are not required to be in the same platform. It will be appreciated that alternative delivery client 251 and mail client 252 may be located within different platforms controlled by a sender or a recipient, as illustrated in FIG. 2B. Other configurations may exist.

Figure 3:
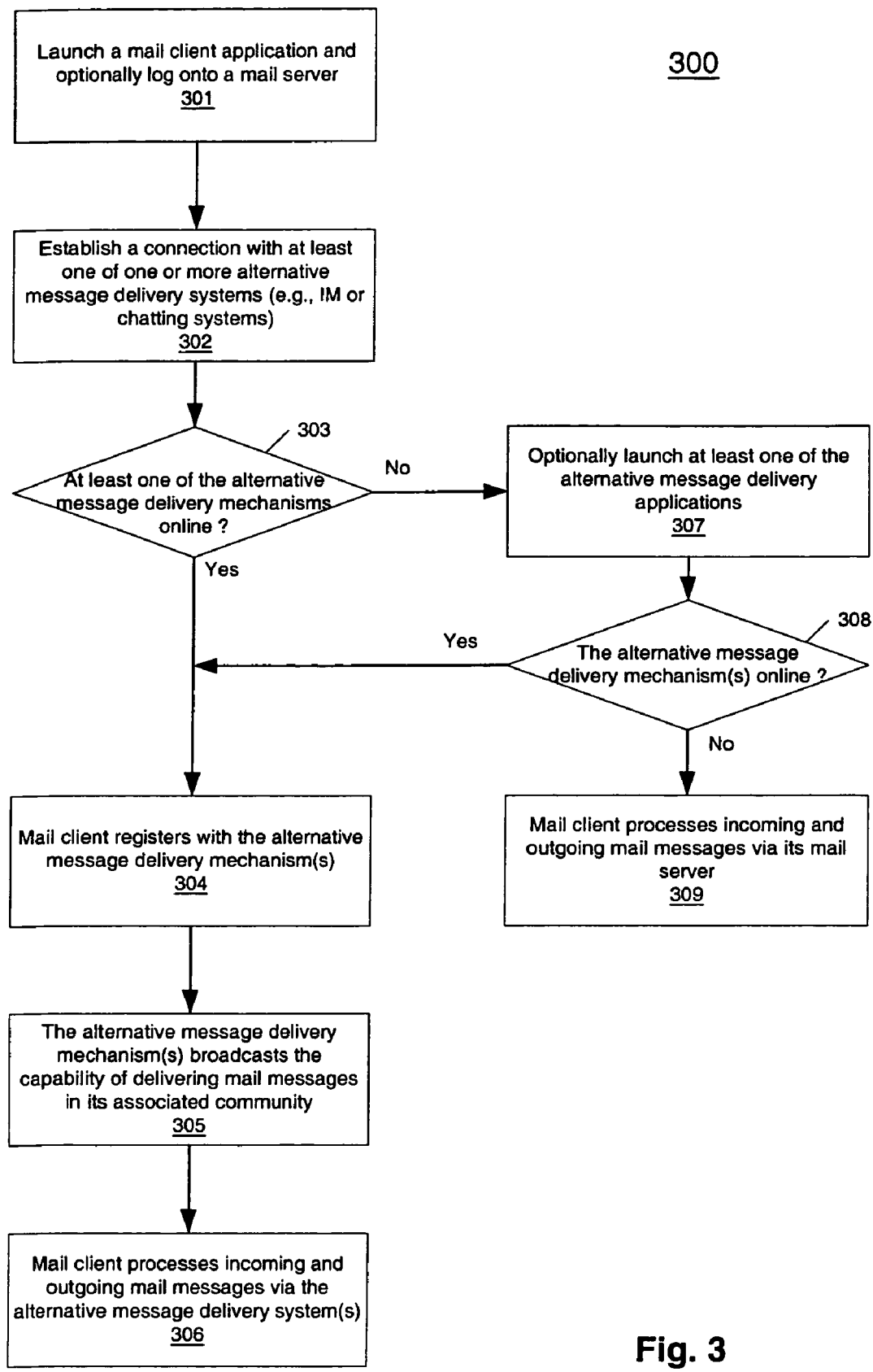
FIG. 3 is a flow diagram illustrating an exemplary process for processing electronic messages, according to one embodiment of the invention.

FIG. 3 is a flow diagram illustrating an exemplary process for registering a mail client with an alternative message delivery system, according to one embodiment of the invention. Exemplary process 300 may be performed by a processing logic that may comprise hardware (circuitry, dedicated logic, etc.), software (such as is run on a general purpose computer system or a dedicated machine), or a combination of both. In one embodiment, exemplary process 300 includes launching an application of a client, the application capable of transmitting and receiving data with another application, determining whether the client has an instant messaging (IM) capability, and registering with the client's IM capability, such that the application is able to transmit and receive data, via the client's IM capability, with another application over a network.

Referring to FIG. 3, at block 301, when a mail client, such as mail client 205, is launched and optionally logs into a mail server (e.g., mail server 207), at block 302, the mail client tries to establish a connection with at least one of one or more alternative message delivery systems, such as IM system having IM client 204 and IM server 206. If the respective alternatively message delivery system is not activated (block 303), at block 307, mail client may optionally launch an application associated with the alternative messaging system. If the alternative message application cannot be launched (block 308), at block 309, the mail client may fall back to the mail server to handle the incoming and outgoing mail messages.

Once the alternative messaging system is activated, at block 304, the mail client may register with the alternative messaging system. After the mail client has registered with the alternative message system, at block 305, the alternative message client may broadcast or advertise its capability to handle mail messages to a community associated with the alternative messaging system, such as IM messaging community. Thereafter, at block 306, the mail client may process incoming and outgoing mail messages via the registered alternative messaging system. Other operations apparent to one with ordinary skill in the art may be included.

Figure 4:
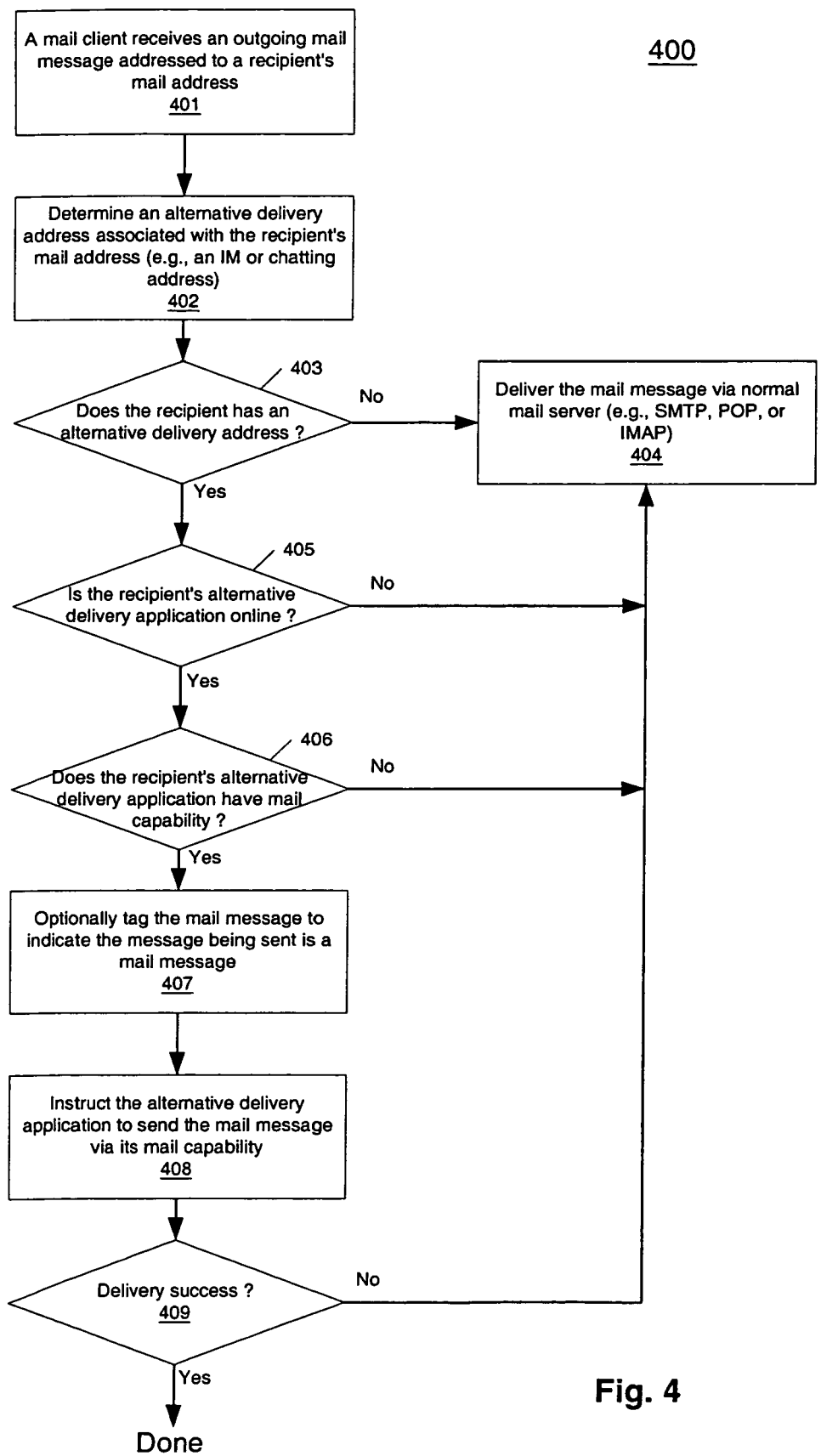
FIG. 4 is a flow diagram illustrating an exemplary process for processing electronic messages, according to another embodiment of the invention.

FIG. 4 is a flow diagram illustrating an exemplary process for delivering an electronic message according to one embodiment of the invention. Exemplary process 400 may be performed by a processing logic that may comprise hardware (circuitry, dedicated logic, etc.), software (such as is run on a general purpose computer system or a dedicated machine), or a combination of both. In one embodiment, exemplary process 400 includes receiving, at a mail client, a mail message addressed to a mail address of a recipient at a remote site, determining, at the mail client, whether there is an alternative delivery mechanism available for the recipient, delivering the mail message to the recipient via the alternative delivery mechanism, if the alternative delivery mechanism is available, and delivering the mail message to a mail server which forwards the mail message to the recipient, if the alternative delivery mechanism is unavailable.

Referring to FIG. 4, when a mail client (e.g., mail client 205) receives an outgoing mail message addressed to a mail address of a recipient (block 401), at block 402, the mail client determines whether there is an alternative messaging system (e.g., IM client 204) available for the mail address of the recipient. In one embodiment, the mail client determines the alternative delivery address (e.g., IM address) of the recipient based on the mail address of the recipient. The mail client may look up in a database, such as an address book of the sender (e.g., client 201) to search for an alternative address (e.g., IM address) associated with the mail address of the recipient. If there is no alternative messaging system available (block 403), at block 404, the mail client delivers the message to a corresponding mail server (e.g., mail server 207), which forwards the message to the recipient via an ordinary mail system.

If there is an alternative messaging system available for the mail address of the recipient, at block 405, mail client or the alternative messaging client may determine whether the recipient's alternative messaging system is online (e.g., whether the recipient IM client is running). If the recipient's alternative messaging system is not running, the mail client may fall back to the mail server to process the mail message (block 404).

If the recipient's alternative messaging system is online (e.g., the IM client 210 is running), at block 406, the mail client or the alternative messaging client may determine whether the recipient's alternative messaging client can handle mail messages. In one embodiment, the determination may be performed based on whether the recipient's mail client has registered with its alternative messaging client and the alternative messaging client has advertised such capability in the associated community. If the recipient's alternative messaging client does not have such capability, the mail client may fall back to the mail server to process the mail message (block 404).

If the recipient's alternative messaging system has a capability to handle mail messages, at block 407, the message may be tagged with an identification to indicate that the message is an email message rather than an ordinary message associated with the alternative messaging system. In addition, according to one embodiment, the message may be repackaged as or converted to a message conforming to a protocol of the alternative messaging system before being transmitted over by the alternative messaging system at block 408.

At block 409, the mail client may examine the return status received from the alternative messaging system to determine whether the delivery is successfully. If the delivery is unsuccessful, the mail client may fall back to the mail server to process the mail message again (block 404). Other operations apparent to one with ordinary skill in the art may be included.

Figure 5:
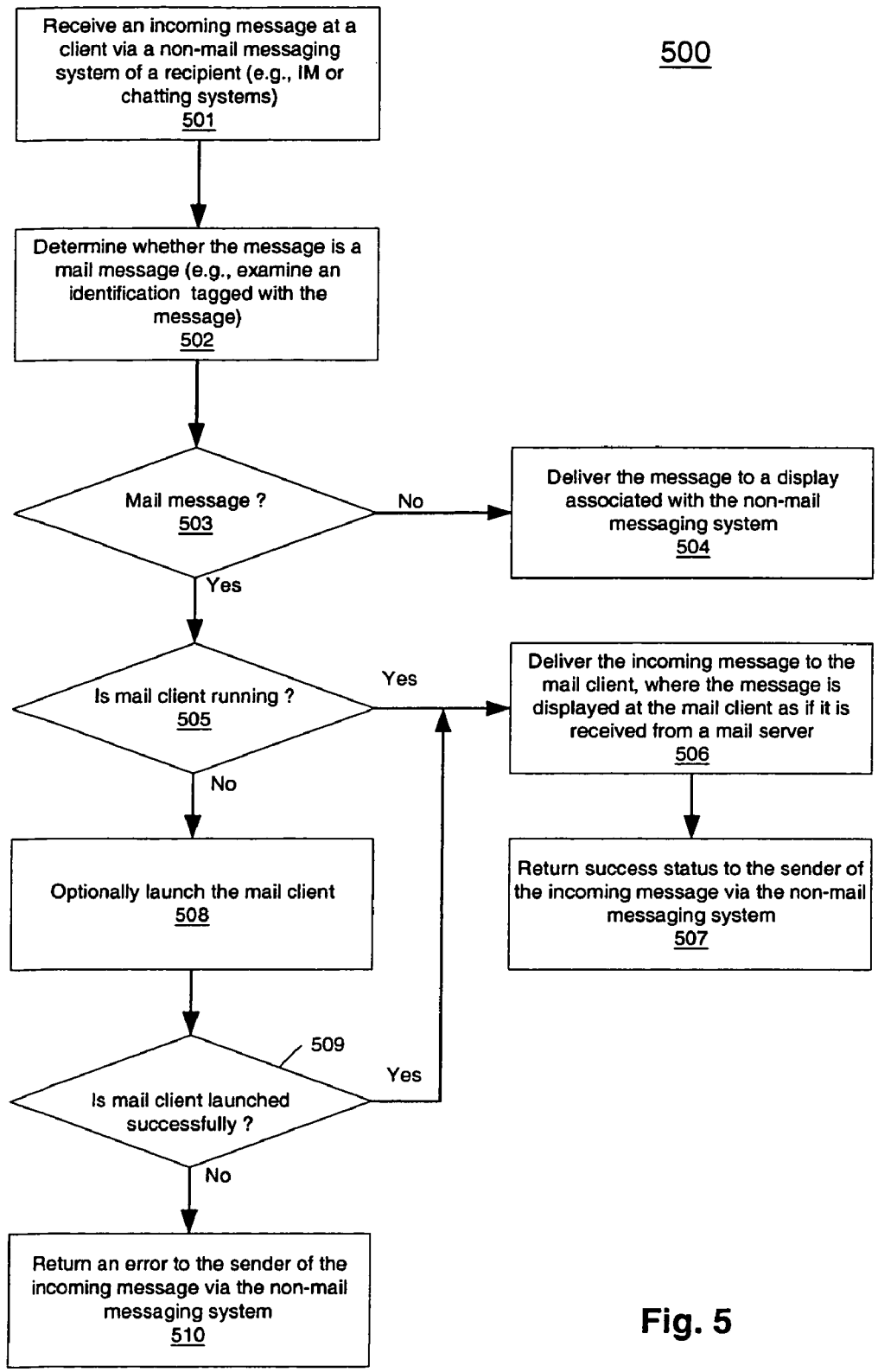
FIG. 5 is a flow diagram illustrating an exemplary process for processing electronic messages, according to yet another embodiment of the invention.

FIG. 5 is a block diagram illustrating an exemplary process for handling incoming electronic message according to one embodiment of the invention. Exemplary process 500 may be performed by a processing logic that may comprise hardware (circuitry, dedicated logic, etc.), software (such as is run on a general purpose computer system or a dedicated machine), or a combination of both. In one embodiment, exemplary process 500 includes receiving a message at an instant messaging (IM) client from an originator over a network, the message received designated to an application communicably coupled to the IM client, determining, at the IM client, which application the message is designated to, and delivering the message to the designated application via an application programming interface (API).

Referring to FIG. 5, when an incoming message is received at a client via a non-mail messaging system of a recipient (block 501), such as an IM system, at block 502, the non-mail messaging client determines whether the message is a mail message. In one embodiment, the determination is performed based on whether the incoming message is tagged with an identification indicating the message as a mail message. If the message is not a mail message (block 503), the message is delivered and displayed at a display of the non-mail messaging client at block 504 (e.g., the message is delivered in an instant messaging user interface).

If the message is determined to be a mail message, at block 505, the non-mail messaging client determines whether the mail client of the recipient is running. If the corresponding mail client is running, at block 506, the message is forwarded to the mail client and displayed at the mail client as if it is received through a mail system. In one embodiment, the message may be optionally repackaged as a mail message prior to being displayed at the mail client. Such operations are performed transparently to a user of the mail client. Thereafter, at block 507, the mail client may return a success status to the sender via the non-mail messaging system. As a result, the sender may substantially instantly receive a confirmation of arrival of the message at the recipient.

If the corresponding mail client is not running (block 505), at block 508, the non-mail messaging client may optionally attempt to launch the mail client. If the mail client is successfully launched (block 509), the message is then forwarded to the mail client to be displayed as a mail message at block 506 and thereafter return a success status to the sender at block 507. Otherwise, at block 510, a failure status is returned. Other operations apparent to one with ordinary skill in the art may be included.

According to one embodiment, exemplary system 200 of FIG. 2A is not limited to rerouting an email message via an alternative messaging system. It will be appreciated that the techniques may be applied to other applications capable of receiving data from a remote application. For example, a user with a mobile device may use exemplary system 200 to update his or her calendar or to schedule a meeting with someone. A traditional approach may rely on email system to perform such action. In a traditional approach, a user typical sends an email to a server (e.g., an email server or an electronic organizer) to update the calendar. Since the email system typically goes through one or more routing servers and may cause delay, the update may cause conflicts with other events, which the user has no way to know instantly. However, according to one embodiment, a user may use exemplary system 200 to send a message or a command to update his or her calendar through a better alternative messaging system, such as IM system. The message or command may be sent to the corresponding targeted application quicker and substantial instantly receive a confirmation of an arrival of the message or command. As a result, the user may instantly know whether the message has been received by the recipient and whether a conflict exists.

Figure 6:
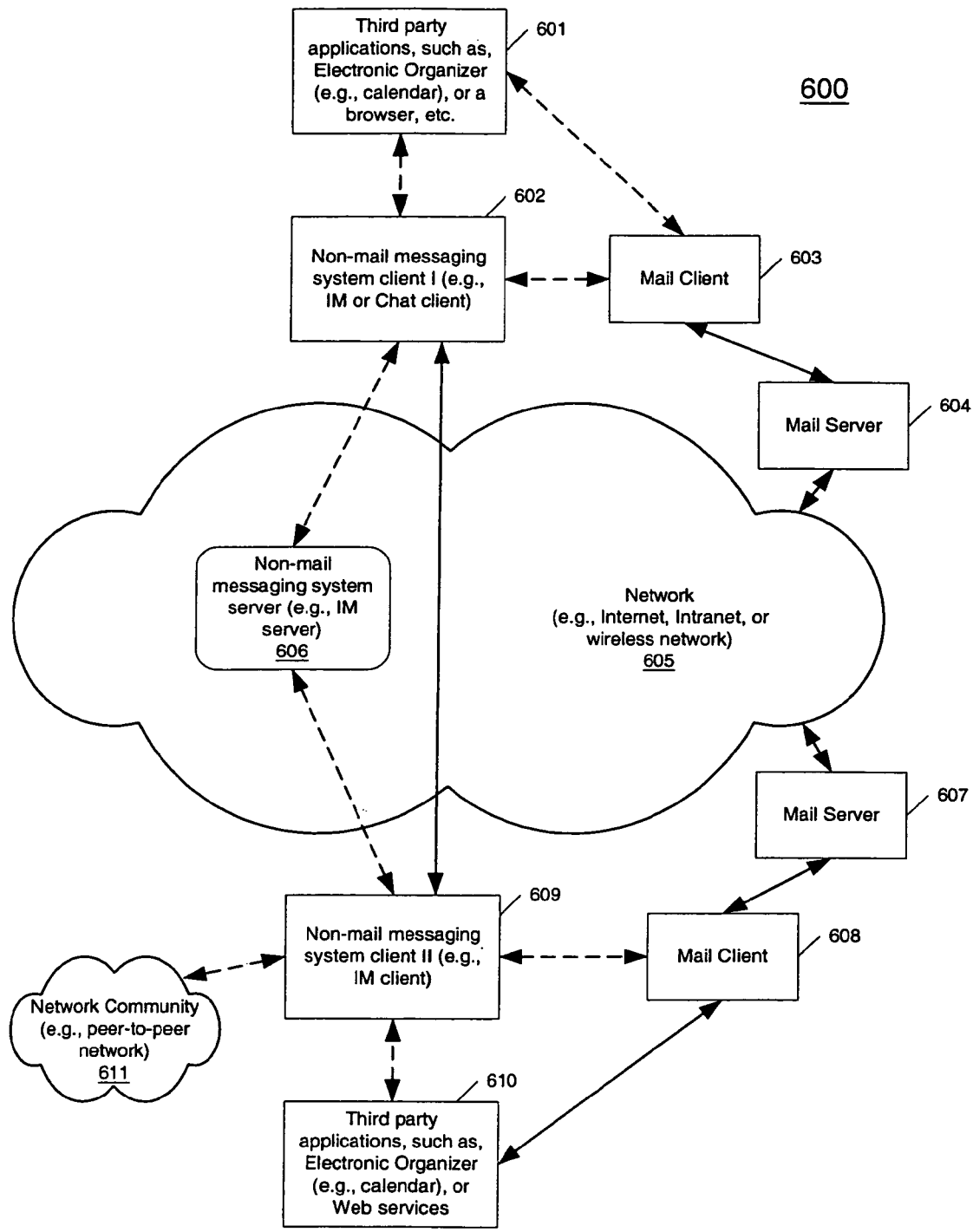
FIG. 6 is a block diagram illustrating an exemplary system for processing electronic messages, according to another embodiment of the invention.

FIG. 6 is a block diagram illustrating an exemplary message processing system according to one embodiment of the invention. In this embodiment, third party applications 601 and 610 may utilize exemplary system 600 to send and receive messages or commands via an alternative messaging system (non-mail clients 602 and 609 and server 606) other than a mail system (mail clients 603 and 608, and mail servers 604 and 607, as well as the routing servers in between). According to one embodiment, third party application 601, such as an electronic organizer, may use mail client 603 or non-mail client (e.g., IM client) 602 to update a recipient's counter part application 610. Application 601 may perform the determination whether an alternative messaging system 602, other than mail system 603, is available, using techniques similar to those described above. Alternatively, application 601 may send and receive message through mail client 603 and mail client 603 performs such determination using one of the aforementioned techniques.

In addition, a local community network 611, such as a peer-to-peer network may be coupled to the non-mail messaging client or the mail client, such that a message being sent or received may be processed by at least one of the peers in the community 611.

Furthermore, the non-mail messaging system is not limited to a traditional IM system available to a wired network. It will be appreciated that other types of network, such as a wireless network (e.g., a cellular network or a home networking environment, such as an IEEE 802.xx network), may utilize the techniques described above. For example, network 605 may include a cellular network and application 601 may be an application running at a portable PDA (personal digital assistant) or a cellular phone capable of sending or receiving mail messages. In addition, application 601 may also be capable of receiving wireless instant messages, such as SMS (short message service) messages available in a cellular network to substantial instantly transmit a message to a recipient's counterpart, which forwards the message to its mail client and displays the message as a mail message in an Inbox of the recipient's mail. Other configurations apparent to one with ordinary skill in the art may exist.

According to one embodiment, more than one alternative delivery mechanisms, such as, for example, IM, wireless SMS (short message services), two-way paging system, or facsimile application, etc., may be available for the sender to select. The mail client may select from the multiple alternative delivery mechanisms a most appropriate delivery mechanism to deliver the mail message. In one embodiment, the mail client may select the most appropriate delivery mechanism based on an attribute of the mail message, the user configuration, or the user preferences. For example, the mail client may select the IM or cellular SMS services to deliver the message if it is determined that the message needs to be delivered in the fastest manner. Alternatively, the mail client may select a facsimile service to deliver the message if it is determined that the message needs to be sent in the most secure manner. The recipient's addresses or the fax numbers of the alternative delivery mechanisms may be stored in an address book of the sender. The mail client may perform a lookup operation in the address book to discover the multiple alternative delivery mechanisms. The mail client may interrogate the respective system to determine whether the recipient's counterpart application is online and has the capability to handle the message that is about to send.

As described above, non-mail messaging system client 609, mail client 608, and third party applications 610 are not required to be within the same platform. It will be appreciated that non-mail messaging system client 609, mail client 608, and third party applications 610 may be located within different platforms controlled by a sender or a recipient, as illustrated in FIG. 2B. Other configurations may exist.

Figure 7:
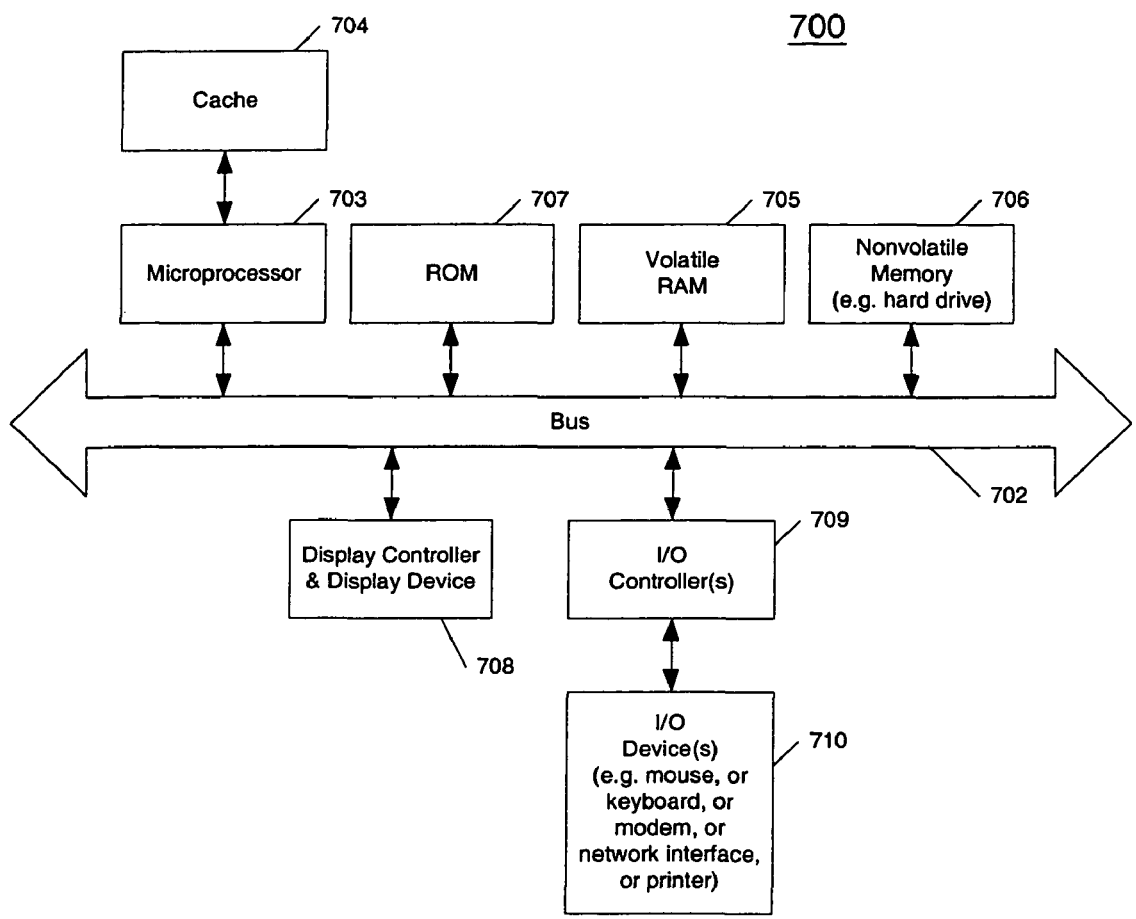
FIG. 7 is a block diagram of a data processing system which may be used to process electronic messages, in accordance with one embodiment of the invention.

FIG. 7 is a block diagram of a digital processing system which may be used with one embodiment of the invention. For example, the system 700 shown in FIG. 7 may be used as a client computer system (e.g., the client computer systems 102, 104, 118, and/or 120 of FIG. 1), a Web server system (e.g., the Web server system 128), or a conventional server system, etc. Furthermore, the digital processing system 700 may be used to perform one or more functions of an Internet service provider, such as the ISP 124 and 126.

Note that while FIG. 7 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 7 may, for example, be an Apple Macintosh computer or a IBM compatible PC.

As shown in FIG. 7, the computer system 700, which is a form of a data processing system, includes a bus 702 which is coupled to a microprocessor 703 and a ROM 707, a volatile RAM 705, and a non-volatile memory 706. The microprocessor 703, which may be, for example, a PowerPC G4 or PowerPC G5 microprocessor from Motorola, Inc. or IBM, is coupled to cache memory 704 as shown in the example of FIG. 7. The bus 702 interconnects these various components together and also interconnects these components 703, 707, 705, and 706 to a display controller and display device 708, as well as to input/output (I/O) devices 710, which may be mice, keyboards, modems, network interfaces, printers, and other devices which are well-known in the art. Typically, the input/output devices 710 are coupled to the system through input/output controllers 709. The volatile RAM 705 is typically implemented as dynamic RAM (DRAM) which requires power continuously in order to refresh or maintain the data in the memory. The non-volatile memory 706 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 7 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 702 may include one or more buses connected to each other through various bridges, controllers, and/or adapters, as is well-known in the art. In one embodiment, the I/O controller 709 includes a USB (Universal Serial Bus) adapter for controlling USB peripherals. Alternatively, I/O controller 709 may include an IEEE-1394 adapter, also known as FireWire adapter, for controlling FireWire devices.

Thus, a method and apparatus for processing electronic messages have been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method by a data processing system, the method comprising:
   in response to receiving a message from a user, the message addressed to a receiving client through a particular delivery mechanism, determining, by the data processing system, at a local application associated with a sending client of the message, whether the receiving client associated with a delivery mechanism that is an alternative to the particular delivery mechanism is online at a remote site;
   selecting, by the data processing system transparently to the user, at the local application, the delivery mechanism from a plurality of delivery mechanisms that can reach the receiving client if the receiving client is determined online at the remote site, the plurality of delivery mechanisms including the particular delivery mechanism;
   sending, by the data processing system, the message including one or more electronic commands to a remote application via the selected delivery mechanism, wherein the electronic commands are to be executed by the remote application, wherein the message is forwarded from the receiving client to the remote application transparently relative to a user of the receiving client; and
   receiving, by the data processing system, substantially instantly subsequent to sending the message, a confirmation via the selected delivery mechanism indicating whether the electronic commands have been executed successfully by the remote application.

2. The computer-implemented method of claim 1, wherein the sending comprises:
   forwarding the electronic commands to a delivery client application; and
   sending, from the delivery client application, the electronic commands to a delivery server according to the selected delivery mechanism.

3. The computer-implemented method of claim 2, wherein the forwarding comprises:
   detecting if the delivery client application is running or not; and
   launching the delivery client application if the delivery client application is not running.

4. The computer-implemented method of claim 2, wherein the delivery client application and the local application are running from separate platforms, and wherein the forwarding is based on peer-to-peer communication.

5. The computer-implemented method of claim 1, wherein the delivery mechanism is capable of directly and substantially instantly delivering the electronic commands to the remote application, and wherein the selected delivery mechanism is capable of substantially instantly receiving a confirmation of arrival of the electronic commands at the remote site.

6. The computer-implemented method of claim 5, wherein the delivery mechanism is based on an instant message (IM) protocol.

7. The computer-implemented method of claim 5, wherein the delivery mechanism is based on a short message service (SMS) protocol.

8. The computer-implemented method of claim 5, wherein the local application is a calendar application and wherein the application protocol is based on a mail protocol.

9. The computer-implemented method of claim 1, wherein the remote application is associated with a mail address and wherein the selecting comprises looking up, in a database, an alternative address of the remote application used in the selected delivery mechanism based on the mail address associated with the remote application.

10. The computer-implemented method of claim 2, wherein the selecting comprises determining whether the remote application is enabled with a capability to receive the electronic commands via the selected delivery mechanism.

11. The computer-implemented method of claim 10, wherein the selecting further comprises determining whether the delivery client application is capable of receiving the electronic commands.

12. A computer-implemented method by a data processing system for processing an electronic command, the method comprising:
   sending, by the data processing system, an online status from a client through a delivery mechanism;
   receiving, by the data processing system if the online status indicates the client is online, an electronic message including an electronic command at the client from an originator over a network via the delivery mechanism, the electronic command received designated to an application communicably coupled to the client, and the electronic command being packaged inside the electronic message from the originator;
   determining, at the client by the data processing system, which application the electronic message is designated to, the determination being transparently relative to a user of the client;
   repackaging, by the data processing system, the electronic command from the electronic message for the designated application;
   delivering, by the data processing system, the electronic command to the designated application for execution via an application programming interface (API); and
   sending, by the data processing system, to the delivery mechanism, substantially instantly subsequent to receiving the electronic command, a confirmation indicating whether the execution of the electronic commands by the designated application is successful.

13. The computer-implemented method of claim 12, wherein the delivery mechanism is based on a delivery protocol, and wherein the originator communicates with the designated application based on an application protocol are separate from the delivery protocol.

14. The computer-implemented method of claim 12, wherein the determining is based on a signature tagged with the electronic message to designate the application.

15. The computer-implemented method of claim 12, further comprising converting the electronic message to the electronic command to be executed by the designated application prior to the delivering.

16. The computer-implemented method of claim 12, wherein the designated application is a scheduling application.

17. The computer-implemented method of claim 12, wherein the delivering comprises:
  detecting if the designated application is running or not;
  launching the designated application if the designated application is not according to the detecting; and
  establishing a connection between the client and the designated application for the delivering.

18. The computer-implemented method of claim 13, wherein the delivery mechanism is capable of directly substantially instantly delivering the electronic message to the client from the originator, and wherein the delivery mechanism is capable of substantially instantly sending a conformation of arrival of the electronic message at the client to the originator.

19. The computer-implemented method of claim 13, wherein the delivery protocol is an instant messaging (IM) protocol.

20. The computer-implemented method of claim 13, wherein the application protocol is based on mail protocol.

21. A non-transitory computer readable storage medium encoded with computer program instructions which when executed by a data processing system cause said system to perform a method, the method comprising:
  in response to receiving a message from a user, the message addressed to a receiving client through a particular delivery mechanism, determining, at a local application associated with a sending client of a message, whether a receiving client associated with a delivery mechanism that is an alternative to the particular delivery mechanism is online at a remote site;
  selecting, by the data processing system transparently to the user, at the local application, the delivery mechanism from a plurality of delivery mechanisms that can reach the receiving client if the receiving client is determined online at the remote site, the plurality of delivery mechanisms including the particular delivery mechanism;
  sending the message including one or more electronic commands to a remote application via the selected delivery mechanism, wherein the electronic commands are to be executed by the remote application, wherein the message is forwarded from the receiving client to the remote application transparently relative to a user of the receiving client; and
  receiving, substantially instantly subsequent to sending the message, a confirmation via the selected delivery mechanism indicating whether the execution of the electronic commands by the remote application is successful.

22. The non-transitory computer readable storage medium of claim 21, wherein the sending comprises:
  forwarding the electronic commands to a delivery client application; and
  sending, from the delivery client application, the electronic commands to a delivery server according the selected delivery mechanism.

23. The non-transitory computer readable storage medium of claim 22, wherein the forwarding comprises:
  detecting if the delivery client application is running or not; and
  launching the delivery client application if the delivery client application is not running.

24. The non-transitory computer readable storage medium of claim 22, wherein the delivery client application and the local application are running from separate platforms and wherein the forwarding is based on peer-to-peer communication.

25. The non-transitory computer readable storage medium of claim 21, wherein the delivery mechanism is capable of directly and substantially instantly delivering the electronic commands to the remote application and wherein the selected delivery mechanism is capable of substantially instantly receiving a confirmation of arrival of the electronic commands at the remote site.

26. The non-transitory computer readable storage medium of claim 25, wherein the delivery mechanism is based on an instant messaging (IM) protocol.

27. The non-transitory computer readable storage medium of claim 25, wherein the delivery mechanism is based on a short message service (SMS) protocol.

28. The non-transitory computer readable storage medium of claim 25, wherein the local application is a calendar application and wherein the application protocol is a mail protocol.

29. The non-transitory computer readable storage medium of claim 21, wherein the remote application is associated with an mail address and wherein the selecting comprises looking up, in a database, an alternative address of the remote application used in the selected delivery mechanism based on the mail address associated with the remote application.

30. The non-transitory computer readable storage medium of claim 22, wherein the selecting comprises determining whether the remote application is enabled with a capability to receive the electronic commands via the selected delivery mechanism.

31. The non-transitory computer readable storage medium of claim 30, wherein selecting further comprises determining whether the delivery client application is capable of receiving the electronic commands.

32. A non-transitory computer readable storage medium encoded with computer program instructions which when executed by a data processing system cause said system to perform a method for processing an electronic command, the method comprising:
  sending an online status from a client through a delivery mechanism;
  receiving, if the online status indicates the client is online, an electronic message including an electronic command at the client from an originator over a network through the delivery mechanism, the electronic command received designated to an application communicably coupled to the client, and the electronic command being packaged inside the electronic message from the originator;
  determining, at the client, which application the electronic message is designated to, the determination being transparently relative to a user of the client;

repackaging the electronic command from the electronic message for the designated application;

delivering the electronic command to the designated application for execution via an application programming interface (API); and sending to the delivery mechanism, substantially instantly subsequent to receiving the electronic command, a confirmation indicating whether the execution of the electronic commands by the designated application is successful.

33. The non-transitory computer readable storage medium of claim 32, wherein the delivery mechanism is based on a delivery protocol, and wherein the originator communicates with the designated application based on an application protocol separate from the delivery protocol.

34. The non-transitory computer readable storage medium of claim 32, wherein the determining is based on a signature tagged with the electronic message to designate the designated application.

35. The non-transitory computer readable storage medium of claim 32, further comprising converting the electronic message to the electronic command to be executed by the designated application prior to the delivering.

36. The non-transitory computer readable storage medium of claim 32, wherein the designated application is a scheduling application.

37. The non-transitory computer readable storage medium of claim 32, wherein the delivering comprises detecting if the designated application is running or not;

launching the designated application if the designated application is not running based on the detecting; and establishing a connection between the client and the designated application, wherein the API is based on the connection.

38. The non-transitory computer readable storage medium of claim 33, wherein the delivery mechanism is capable of directly and substantially instantly delivering the electronic message to the client from the originator and wherein the delivery mechanism is capable of substantially instantly sending a confirmation of arrival of the electronic message at the client to the originator.

39. The non-transitory computer readable storage medium of claim 33, wherein the delivery protocol is an instant messaging (IM) protocol.

40. The non-transitory computer readable storage medium of claim 33, wherein the application protocol is a mail protocol.

41. A data processing system comprising:

a memory storing executable instructions;

a network interface for a delivery mechanism; and a processor coupled to the network interface and the memory to execute the executable instructions from the memory for operating the remote application, the processor being configured to determine, in response to receiving a message from a user, the message addressed to a receiving client through a particular delivery mechanism, at a local application associated with a sending client of the message, whether the receiving client associated with a delivery mechanism that is an alternative to the particular delivery mechanism is online at a remote site, select, transparently to the user, at the local application, the delivery mechanism from a plurality of delivery mechanisms that can reach the receiving client if the receiving client is determined online at the remote site, the plurality of delivery mechanism including the particular delivery mechanism, send the message including one or more electronic commands to a remote application via the selected delivery mechanism, wherein the electronic commands are to be executed by the remote application, wherein the message is forwarded from the receiving client to the remote application transparently relative to a user of the receiving client, and receive, substantially instantly subsequent to sending the message, a confirmation via the selected delivery mechanism indicating whether the execution of the electronic commands by the remote application is successful.

42. A data processing system for processing an electronic command, the data processing system comprising:

a memory storing executable instructions;

a network interface for a delivery mechanism; and a processor coupled to the network interface and the memory to execute the executable instructions from the memory for operating the remote application, the processor being configured to send an online status from a client through the delivery mechanism, receive, if online status indicates the delivery is online, an electronic message including an electronic command at the client from an originator over a network through the delivery mechanism, the electronic command received designated to an application communicably coupled to the client, and the electronic command being packaged inside the electronic message from the originator, determine, at the client, which application the electronic message is designated to, the determination being transparently relative to a user of the client, repackage the electronic command from the electronic message for the designated application, deliver the electronic command to the designated application for execution via an application programming interface (API), and send to the delivery mechanism, substantially instantly subsequent to receiving the electronic command, a confirmation indicating whether the execution of the electronic commands by the designated application is successful.

* * * * *

UNITED STATES PATENT AND TRADEMARK OFFICE
CERTIFICATE OF CORRECTION

PATENT NO. : 7,836,136 B1  
APPLICATION NO. : 11/496865  
DATED : November 16, 2010  
INVENTOR(S) : Jens Peter Alfke It is certified that error appears in the above-identified patent and that said Letters Patent is hereby corrected as shown below:

In column 12, line 34, before "operations" insert -- like --.

In column 15, line 39, delete "counter part" and insert -- counterpart --, therefor.

In column 18, line 57, in claim 12, delete "transparently" and insert -- transparent --, therefor.

In column 22, line 45, in claim 42, delete "transparently" and insert -- transparent --, therefor.

Signed and Sealed this  
Twenty-first Day of February, 2012

David J. Kappos  
*Director of the United States Patent and Trademark Office*